(12) United States Patent
Baldemair et al.

(10) Patent No.: US 7,177,378 B2
(45) Date of Patent: Feb. 13, 2007

(54) MINIMIZATION OF ERROR CONTRIBUTIONS IN A DMT SYSTEM

(75) Inventors: Robert Baldemair, Hägersten (SE); Pål Frenger, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 830 days.

(21) Appl. No.: 10/101,505

(22) Filed: Mar. 20, 2002

(65) Prior Publication Data
US 2003/0007573 A1    Jan. 9, 2003

Related U.S. Application Data

(60) Provisional application No. 60/279,718, filed on Mar. 30, 2001.

(30) Foreign Application Priority Data
Mar. 30, 2001 (EP) .................. 01850061

(51) Int. Cl.
*H03D 1/06* (2006.01)
(52) U.S. Cl. ............ 375/348; 375/346; 375/229; 375/231
(58) Field of Classification Search ........ 375/348, 375/350, 346, 229, 230, 232, 285, 290; 370/209; 455/296, 306, 307; 708/322
See application file for complete search history.

(56) References Cited

U.S. PATENT DOCUMENTS 5,285,474 A    2/1994  Chow et al.
6,882,619 B1 *  4/2005  Gerakoulis ........... 370/209
2002/0131537 A1 *  9/2002  Storm et al. .......... 375/350

FOREIGN PATENT DOCUMENTS

| EP | 0 838 928 A | 4/1998 |
| EP | 0 913 973 A | 5/1999 |
| GB | 2 330 499 A | 4/1999 |

OTHER PUBLICATIONS

Acker et al.; "Improved Time Domain Equalization for ADSL".
*IEEE Transactions on Communications*, vol. 44, No. 1, 1996, pp. 56-64, XP000549644, New York, USA, ISSN: 0090-6778, Naofal Al-Dhahir et al., "Optimum Finite-Length Equalization for Multicarrier Transceivers".
*IEEE*, Communication Theory Mini-Conference, Singapore, Nov. 14-16, 1995, New York, US, pp. 172-176, XP000773406, ISBN: 0-7803-2510-9, B. Farhang-Boroujeny, "Channel Memory Truncation for Maximum Likelihood Sequence Estimation".

(Continued)

*Primary Examiner*—Dac Ha
*Assistant Examiner*—Jaison Joseph
(74) *Attorney, Agent, or Firm*—Nixon & Vanderhye P.C.

(57) ABSTRACT

Error contributions in a DMT system where a received DMT-signal is effected by intersymbol interference, intercarrier interference and additive noise are minimized. Intersymbol interference average power, intercarrier interference average power, and additive noise average power are calculated. A cost function is determined by adding the intersymbol interference average power, the intercarrier interference average power, and the additive noise average power. A constraint is introduced which avoids a trivial solution where a time domain equalizer (TEQ) vector is equal to zero. The cost function is minimized by optimizing the TEQ vector.

16 Claims, 4 Drawing Sheets

OTHER PUBLICATIONS

*Conference Record of Thirtieth Asilomar Conference on Signals, Systems and Computers*, (Cat. No. 96CB36004), Nov. 2-6, 1996, pp. 669-673, vol. 1, XP002173279, IEEE Comput. Soc. Press, Los Alamitos, CA, USA, ISBN: 0-8186-7646-9, Mark Webster et al., "Adaptive Channel Truncation for FFT Detection in DMT Systems—Error Component Partioning".

*IEEE Global Telecommunications Conference (GLOBECOM)*, US, New York, IEEE, Nov. 14, 1995, pp. 2069-2074, XP000633651, ISBN: 0-7803-2510-9, E. Viterbo et al., "How to combat long echoes in OFDM transmission schemes: Sub-channel equalization or more powerful channel coding".

* cited by examiner

MINIMIZATION OF ERROR CONTRIBUTIONS IN A DMT SYSTEM

This application claims the benefit of Provisional Application No. 60/279,718, filed Mar. 30, 2001, the entire content of which is hereby incorporated by reference in this application.

TECHNICAL FIELD OF THE INVENTION

The present invention relates to methods and arrangements to minimize error contributions in a discrete multitone modulation transmission system where a received DMT-signal is affected by error contributions.

DESCRIPTION OF RELATED ART xDSL systems, e.g. Asymmetric Digital Subscriber Line ADSL and Very-High-Speed Digital Subscriber Line VDSL, use an ordinary phone line to transmit data at high speed. When the transmitted signal passes through the line this signal will be filtered by the channel transfer function. This will cause a frequency dependent attenuation and phase-shift. The signal will be smeared out in time. A long impulse response of the channel causes one symbol to disturb the next one.

The modulation scheme standardized for ADSL and VDSL is DMT modulation. The modulation scheme partions the available bandwidth into a number of subchannels (tones) with smaller bandwidth. Each of these subchannels is considered as an independent transmission channel. Each of these channels is modulated by an Quadrature Amplitude signal QAM. The size of the QAM constellation size may vary from channel to channel.

To simplify the demodulation process in the receiver, each DMT symbol is prefixed by the cyclic prefix in the transmitter prior digital filtering and D/A conversion. The demodulation process only works in case that the memory of the channel impulse response is shorter than or at most equal to the length of the cyclic prefix. If this assumption does not hold, the tail of the previous DMT symbol contributes to the block received for the current DMT symbol and undesired Intersymbol Interference ISI. Intercarrier Interference ICI also occurs due to disturbances caused by other tones within the current DMT symbol.

To summarize, an impulse response which does not fulfil the criterion of a short impulse response leads to undesired ISI and ICI. A received block representing one DMT symbol suffers therefore not only from additive noise, but also from Intersymbol Interference and Intercarrier Interference.

In the U.S. Pat. No. 6,097,763 is disclosed a method to provide a frequency-domain training algorithm, to obtain a minimum square error equalizer that accounts for Intersymbol Interference and Noise. The algorithm in the US patent works iteratively in frequency domain. It does not account for the particularities of a DMT receiver, i.e. the FFT used for demodulation. In the US patent, sudden change of transmission conditions will also lead to inconvenience.

SUMMARY OF THE INVENTION

The present invention solves problems related to minimization of error contributions in a Discrete Multitone Modulation transmission system. The problems with earlier known techniques are due to complex algorithms which have been necessary for the minimization. Another problem solved by the invention is difficulties in modifications of an already existing solution by a sudden change of transmission conditions.

The problems are solved by the invention by calculating a cost function represented by error contributions affecting the signal received in the modulation system. After introduction of a constraint, the cost function is minimized with respect to the coefficients of a time-domain equalizer.

More in detail, adding intersymbol interference average power, intercarrier interference average power and additive noise average power, affecting the received signal, calculate the cost function. A constraint is then introduced which avoids the trivial solution i.e. when a TEQ vector that represents the time-domain equalizer is equal to zero. The cost function is thereafter minimized by optimization of the TEQ vector.

The object of the present invention is to introduce an algorithm by which error contributions in a modulation system easily can be minimized.

One advantage with the invention is that complicated calculations involving inverse matrices are avoided.

Another advantage is the possible simple modification of an already existing solution in case of a sudden variation of for example noise.

Yet another advantage with the invention is that the trivial solution (q=0) is avoided.

DESCRIPTION OF PREFERRED EMBODIMENTS

Figure 1:
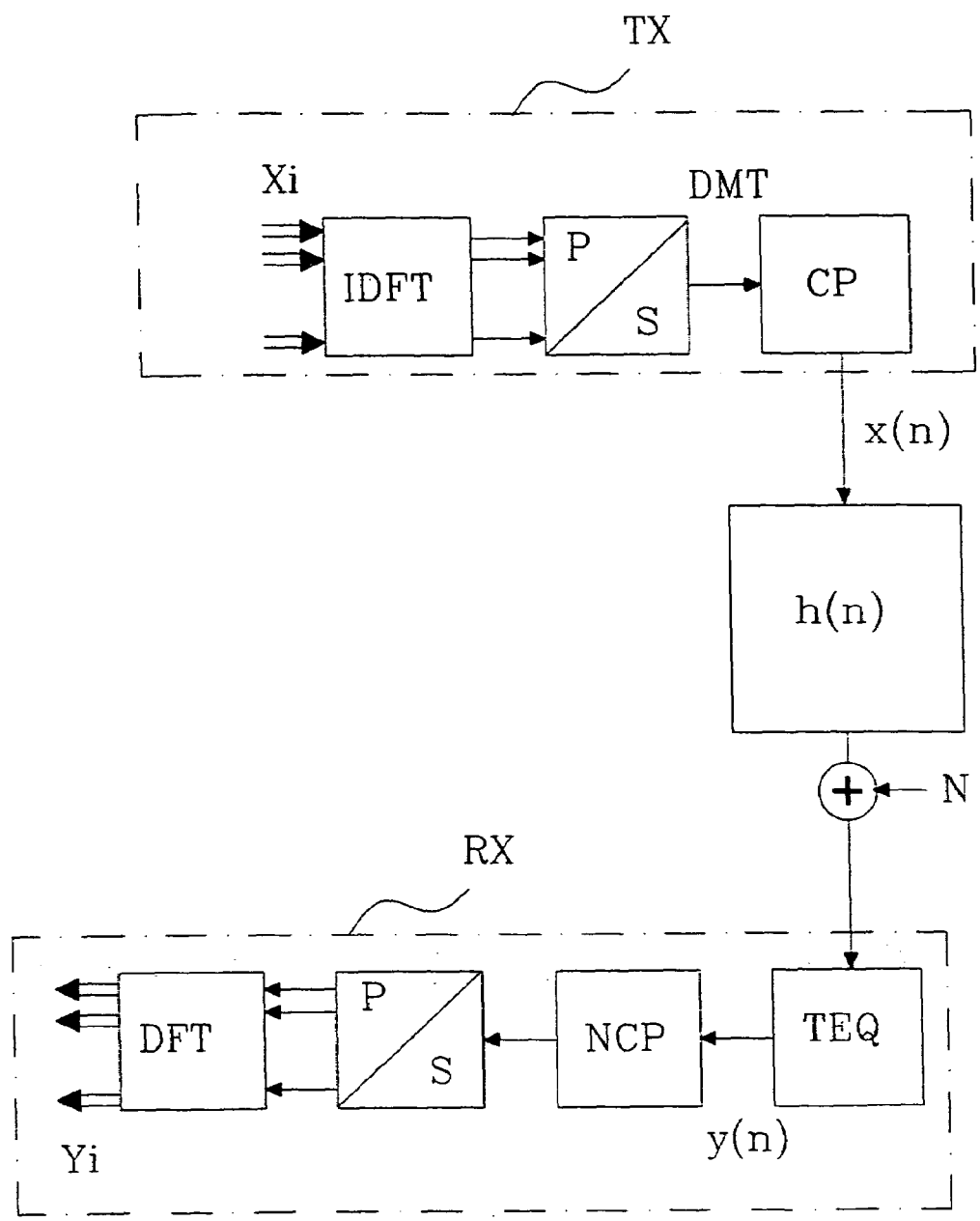
FIG. 1 is a block schematic illustration of a DMT transmission system.

In FIG. 1, a block diagram of a DMT transmission system is shown. The DMT transmission system comprises a transmitter TX, a receiver RX and a transmission channel h(n) in-between. The receiver RX comprises an Inverse Fast Fourier Transform IFFT, a parallel to serial converter P/S and a cyclic prefix generator CP. Data Xi (in frequency domain) to be transmitted are applied to the Inverse Fast Fourier Transform IFFT. The Inverse Fast Fourier Transform implements the modulation very efficiently. The output from the IFFT calculation is called a DMT-symbol DMT (in time domain). To simplify the demodulation process in the receiver, each DMT-symbol is prefixed by a cyclic prefix in the cyclic prefix generator CP before it is transmitted over the transmission channel h(n). The cyclic prefix contains the last P samples of each DMT-symbol. The cyclic prefix is inserted between two consecutive DMT-symbols and therefore serves as guard space between them. The channel h(n) comprises in this example a digital TX-filter, a digital to analog converter D/A, an analog TX-filter, a twitted copper line CH, an analog RX-filter, an analog to digital converter A/D and a digital RX-filter. The filters and converters are not shown in the figure. It is to be noted that the invention is not restricted to the twisted copper line but can also be applied to other media, e.g. a radio channel. The transmission is influenced by noise N, as is indicated in FIG. 1. The receiver RX comprises a Time Domain Equalizer TEQ, a cyclic prefix remover NCP, a serial to parallel converter S/P and a Fast Fourier Transform FFT. When entering the receiver, the Time Domain Equalizer TEQ receives the DMT-symbols transmitted over the channel. The equalizer, which mostly is a FIR filter, is used to shorten the impulse response of the used communication channel. After passing the equalizer TEQ, the cyclic prefix is removed in the cyclic prefix remover NCP. The signal is then serial to parallel converted and thereafter demodulated in the Fast Fourier Transform FFT. The output from the FFT is the output signal Yi (in frequency domain), which is fed into a frequency domain equalizer (not shown in the figure) for further processing.

Data transmission using DMT is degraded by disturbances from three sources, i.e. Intersymbol Interference ISI, Intercarrier Interference ICI and Noise N. When the transmitted signal passes through the line this signal will be filtered by the channel transfer function. This will cause a frequency dependent attenuation and phase-shift. The signal will be smeared out in time. If the channel has a long impulse response this will cause one symbol to disturb the next one. This is called the Intersymbol Interference ISI. Another effect by the impulse response being too long is that orthogonality between tones no longer is maintained and tones will interfere with each other. This is called the Intercarrier Interference ICI. Yet another error contribution to the transmitted signal is the noise N.

A goal is to minimize the overall contributions caused by these three error sources either in frequency domain or in time domain. At first Intersymbol Interference ISI and Intercarrier Interference ICI will be accurately shown in FIG. 2. The power of the Intersymbol Interference contributions accumulated over the used tones in the received signal is thereafter calculated. The power of the other two error sources, namely Intercarrier Interference ICI contributions and noise N contributions are then calculated. Finally the algorithm according to the invention where the calculated power contributions are used, is explained.

In FIG. 2, the effect of Intersymbol Interference ISI and Intercarrier Interference ICI is shown. FIG. 2a discloses the data to be transmitted on two consecutive DMT-symbols. The two graphs in FIG. 2a denoted by $[X_{l-1,k}]$ and $[X_{l,k}]$ show the data to be transmitted at DMT-symbol (l–1) and (l), respectively. Both DMT-symbols are only using tone 2 where DMT-symbol (l–1) transmits (l–j) and DMT symbol (l) transmits (l+j). However both graphs only show the magnitude of the transmitted data and look therefore equal. FIG. 2b shows the impulse response. The memory of the impulse response is much longer than the cyclic prefix which in this case is four samples long. FIG. 2c shows the transmitted signal. Samples 4 to 19 and 24 to 39 establish DMT-symbol (l–1) and (l), respectively. DMT-symbol (l–1) is the IFFT of the data $X_{l-1,k}$ (which are hermitian extended prior to the IFFT operation to assure a real-valued time-domain signal) shown in FIG. 2a. The IFFT applied to the data $X_{l,k}$ delivers DMT-symbol (l). Each DMT-symbol is prefixed by its cyclic prefix (square shaded areas). DMT-symbol (l–1) and its cyclic prefix are denoted by "o", whereas samples marked by "+" belong to DMT-symbol l or its cyclic prefix. FIG. 2d shows the filtered output of both DMT-symbol (l–1) and DMT-symbol (l). In the following we again concentrate on the samples 24 to 39, which are processed by the receiver to demodulate DMT-symbol (l). The Intersymbol Interference ISI from DMT-symbol (l–1) does not decay inside the cyclic prefix. Parts of this ISI contribute to samples 24 to 33. These samples are processed by the receiver and introduce an error to the demodulated DMT symbol (l).

Figure 2A:
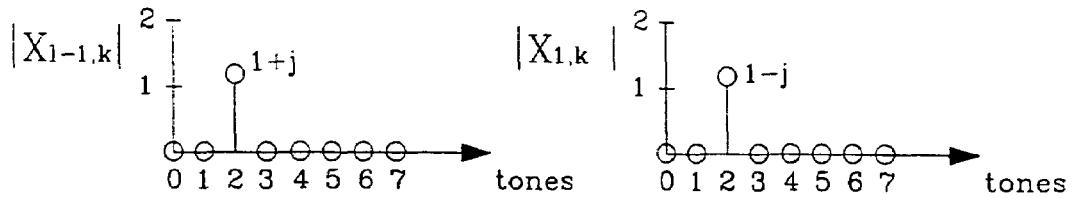
FIG. 2 is an illustration of signals occurring along a DMT transmission chain, whereby the received signal suffers from interference.
Figure 2B:
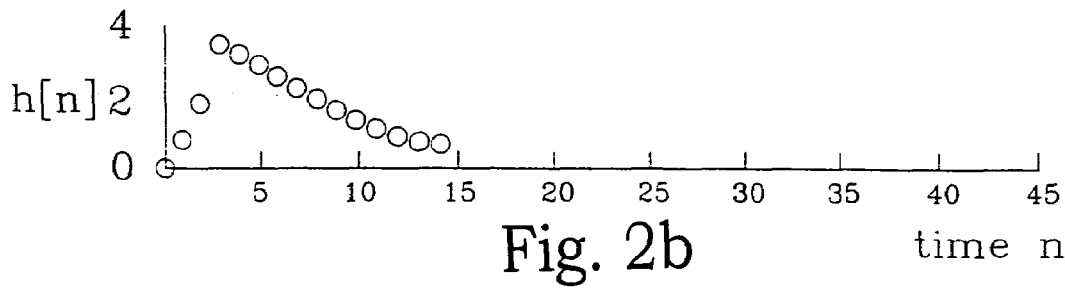
Figure 2C:
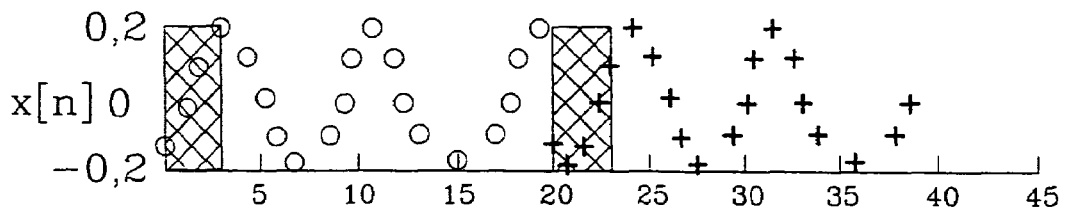
Figure 2D:
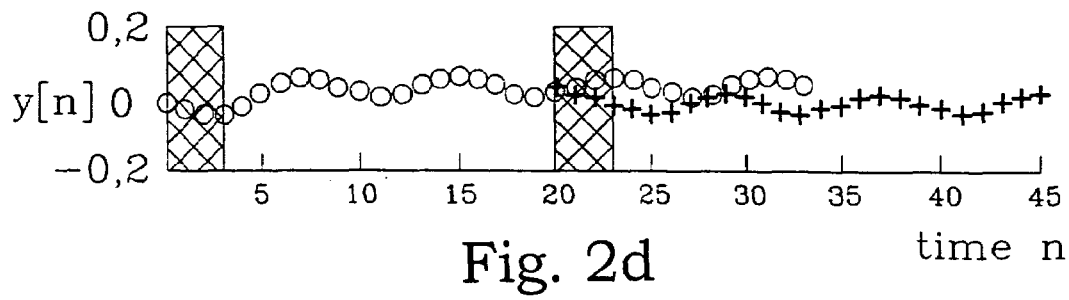
Figure 2E:
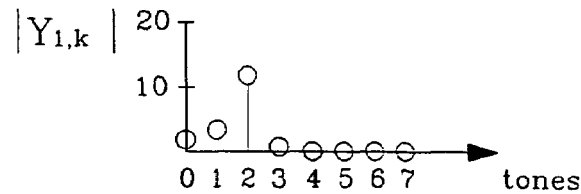

The filtered DMT-symbol (l) starts to become sinusodial $(L_h-1)$ samples after the transmission of DMT symbol (l) has been started, where $L_h$ denotes the length of the channel impulse response. Since the impulse response is much longer than the cyclic prefix, the sequence up to sample 33 is not sinusoidal. The FFT applied to samples 24 to 39 sees in the beginning (samples 24 to 33) a non sinusoidal sequence. Samples 34 to 39 are a pure sinusoidal sequences. The non sinusoidal part causes errors in the demodulated DMT signal. FIG. 2e shows the ICI created by the non sinusoidal sequence as well as ISI from the previous DMT symbol. The demodulated DMT-symbol shows contributions on all tones (the contributions on tone 4 to 7 are quite small) and not only on tone 2. If we are only looking on the last graph, we would think that data have been sent on all tones and not only on tone 2. The error is distinguished into two parts: the first part is denoted by Intersymbol Interference ISI and is caused by the contributions of DMT-symbol (l–1). The second part is called Intercarrier Interference ICI. A datum applied to one specific tone contributes in the receiver not only to this tone, but also leaks into other tones of the same DMT-symbol. This is due to the non sinusoidal beginning of the filtered DMT-symbol l. Even if DMT-symbol (l–1) is zero (no ISI), ICI still occurs, since this error is caused by the non sinusoidal beginning of the filtered DMT-symbol (l).

In the algorithm according to a non-limiting, first example embodiment, a cost function J for the overall error caused by ISI, ICI and additive noise N is formulated. This cost function is minimized with respect to the coefficients of the Time Domain Equalizer TEQ. The impulse response of the channel filtered by the calculated TEQ may not have the shortest impulse response, but the overall error is minimized.

The error contributions ISI, ICI and N in the received signal will now be calculated. The calculated power contributions will then be used in the cost function J that is to be minimized according to the invention.

As a first step, equations for the error due to Intersymbol Interference ISI are set up. The error is defined by:

$$Y_{ISI} = RX_{ISI}Hq$$

where $Y_{ISI}$ is the vector containing ISI contributions on used tones.
R is the Fast Fourier Transform matrix of the used tones.
$X_{ISI}$ is the convolution matrix of sequence $x_{ISI[n]}$. The sequence
$x_{ISI[n]}$ is this sequence to be transmitted, that the received sequence only contains ISI. $x_{ISI[n]}$ contains instead DMT symbol l and its cyclic prefix an all zero block, all other DMT symbols are transmitted.
H is the convolution matrix of channel h[n].
q is the vector containing TEQ coefficients.

Now, the power of the ISI contributions accumulated over the used tones is defined by:

$$P_{ISI} = E\{Y_{ISI}^H Y_{ISI}\} = q^T H^T E\{X_{ISI}^T R^H R X_{ISI}\} Hq$$

where $E\{X_{ISI}^T R^H R X_{ISI}\} = E_{ISI}$ is an expectation matrix depending on the used tones, the average power applied to the used tones, and on a delay parameter $\Delta$. For each received DMT symbol the samples belonging to its cyclic prefix are removed by the cyclic prefix remover NCP. In the receiver, $\Delta$ specifies now for DMT symbol 0, the beginning of that block, which is further processed by the receiver in order to demodulate DMT symbol 0. The block which must be processed in the receiver to demodulate DMT symbol 1 starts now with sample Δ plus l times the length of one DMT symbol uncluding its cyclic prefix. The use of the delay parameter Δ will be further explained later together with FIG. 4.

The next step is to set up an equation for the error due to Intercarrier Interference ICI. The error on tone k due to Intercarrier Interference is defined by:

$$Y_{ICI}^k = r_k^T X_{ICI}^k H q$$

where $Y_{ICI}^k$ is the ICI contribution on used tone k.

$r_k$ is the fast Fourier Transform vector of tone k.

$X_{ICI}^k$ is the convolution matrix of sequence $X_{ICI}^k[n]$. The sequence $x_{ICI}^k[n]$ is this sequence to be transmitted, that the sequence received on tone k at DMT symbol l only contains ICI. $x_{ICI}^k[n]$ transmits only DMT symbol l, all other DMT symbols are equal to zero. Within DMT symbol l the used tones except tone k are modulated.

H is the convolution matrix of channel h[n].

q is the vector containing TEQ coefficients.

Now, the power of the ICI contributions on tone k is defined by:

$$P_{ICI}^k = E\{Y_{ICI}^{k*} Y_{ICI}^k\} = q^T H^T E\{X_{ICI}^{kT} r_k^* r_k^T X_{ICI}^k\} H q$$

where $E\{X_{ICI}^{kT} r_k^* r_k^T X_{ICI}^k\} = E_{ICI}^k$ is an expectation matrix that depends on the used tone k, the average power applied to the used tones, and on the delay parameter Δ.

The power of ICI contributions accumulated over the used tones is $$P_{ICI} = \sum_{k \in k_u} P_{ICI}^k = q^T H^T \left( \sum_{k \in k_u} E_{ICI}^k \right) H q,$$

where the set $k_u$ contains the indices of the used $E_{ICI}$ tones.

The next step is to set up an equation for the error due to additive noise. The error is defined by:

$$Y_{NOISE} = RWq$$

where $Y_{NOISE}$ is the vector containing noise contributions on used tones.

R is the fast Fourier Transform matrix of the used tones.

W is the convolution matrix of noise sequence w[n]. The sequence w[n] contains the noise samples received by the DMT receiver.

q is the vector containing TEQ coefficients.

The power of the noise accumulated over the used tones is $$P_{NOISE} = E\{Y_{NOISE}^H Y_{NOISE}\} = q^T E\{W^T R^H RW\} q$$

where $E\{W^T R^H RW\} = E_{NOISE}$ is an expectation matrix that depends on the used tones and the autocorrelation function (ACF) of the noise.

According to the invention, the Time Domain Equalizer TEQ should minimize the power of the three error contributions Intersymbol Interference ISI, Intercarrier Interference ICI and additive noise N. This is in a first step done by setting up the cost function J. The cost function is defined by:

$$J = P_{ISI} + P_{ICI} + P_{NOISE} = q^T (H^T (E_{ISI} + E_{ISI}) H + E_{NOISE}) q$$

The next step is to introduce a constraint. Without any constraint, minimizing the cost function J yields the trivial solution q=0. To avoid this solution, some constraints must be introduced. In the following, four different embodiments to realize this according to the invention will be presented.

In the first embodiment the constraint is realized by fixing one tap of the overall impulse response. The overall impulse response after the Time Domain Equalizer TEQ is given by the convolution $h_{all}[n] = \{h*q\}[n]$, which can be written as $h_{all} = Hq$ where $h_{all}$ contains the samples of the overall impulse response $h_{all}[n]$, n=0, 1, ..., $L_h + L_q - 2$. The matrix H is the convolution matrix of the channel. Fixing tap v of the overall impulse response to unity, this constraint can be expressed by the equation $h_{all}[v] = h_v^T q = 1$ with $h_v^T$ the v-th row of H. With this linear constraint the solution of the desired Time Domain Equalizer TEQ becomes:

$$q_{OPT} = \arg\min_{q, q^T h_v^T h q = 1} q^T (H^T (E_{ISI} + E_{ICI}) H + E_{NOISE}) q$$

The optimization problem is solved by the linear system of equations $$\lambda (H^T (E_{ISI} + E_{ICI}) H + E_{NOISE}) q_{opt} = h_r$$

The scaling factor λ must be chosen to satisfy $h_{all}[v] = 1$.

The above described solution presents an algorithm where complicated calculations involving inverse matrices are avoided. The fact that the three different powers of error contributions have been separated from each other also makes it possible to easy modify an already existing solution in case of a sudden variation of transmission conditions.

Figure 3:
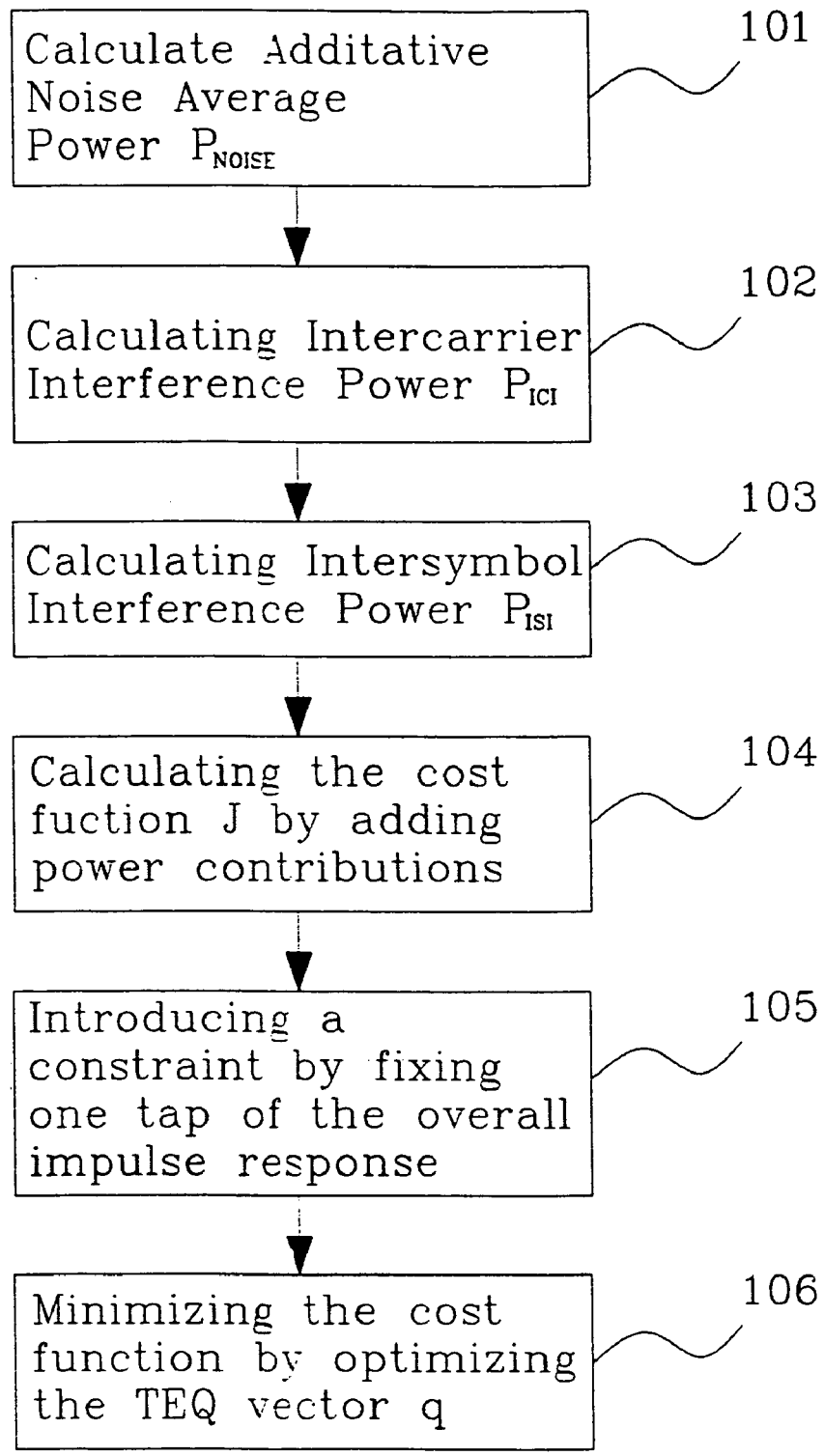
FIG. 3 is a flow chart illustrating the most essential steps of a method according to the invention.

FIG. 3 discloses the most essential steps of the first embodiment. The method according to the invention comprises the following steps:

Calculating Additive Noise average power $P_{NOISE}$. The power is defined as the quadratic form $q^T E_{NOISE} q$ where the expectation matrix $E_{NOISE}$ depends on the autocorrelation function of the noise and on the used tones. This step is disclosed in FIG. 3 with a block 101.

Calculating Intercarrier interference average power $P_{ICI}$. The power is defined as the quadratic form $q^T H^T E_{ICI} H q$, where the expectation matrix $E_{ICI}$ depends on the used tones, on the average power applied to the used tones and on the delay parameter Δ. This step is disclosed in FIG. 3 with a block 102.

Calculating Intersymbol Interference average power $P_{ISI}$. The power is defined as the quadratic form $q^T H^T E_{ISI} H q$, where the expectation matrix $E_{ISI}$ depends on the used tones, on the average power applied to the used tones and on the delay parameter Δ. This step is disclosed in FIG. 3 with a block 103.

Calculating the cost function J by adding the Intersymbol Interference average power $P_{ISI}$, the Intercarrier interference average power $P_{ICI}$ and the Additive Noise average power $P_{NOISE}$. This step is disclosed in FIG. 3 with a block 104.

Introducing a constraint that is realized by fixing one tap of the overall impulse response. This step is disclosed in FIG. 3 with a block 105.

Minimizing the cost function J by optimizing the TEQ vector q. This step is disclosed in FIG. 3 with a block 106.

In the second example embodiment the constraint is applied to the Time Domain Equalizer TEQ. A tap v of the vector q, where the vector q contains the TEQ coefficients, is set to unity. The desired TEQ is obtained by the optimization problem:

$$q_{OPT} = \arg\min_{q, [q]_v=1} q^T(H^T(E_{ISI} + E_{ICI})H + E_{NOISE})q$$

which is solved by the linear system of equations:

$$\lambda(H^T(E_{ISI}+E_{ICI})H+E_{NOISE})q_{opt}=e_v$$

where the vector $e_v$ is equal to "one" at position v and equal to "zero" otherwise.

Figure 4:
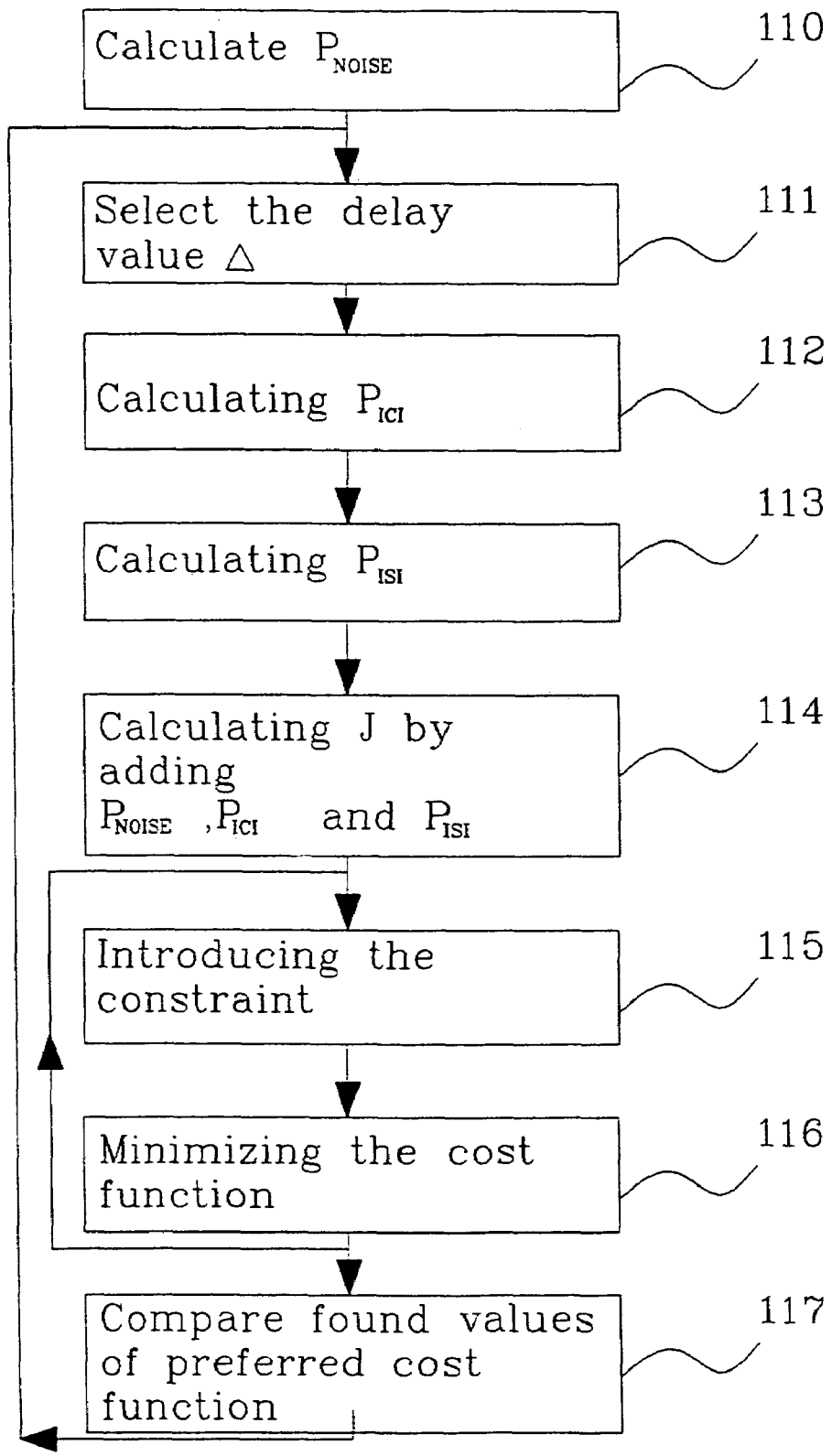
FIG. 4 is a flow chart illustrating the selection of a constraint corresponding to a preferred cost function.

The scaling factor $\lambda$ must be chosen to fulfil the constraint $[q_{opt}]_v=1$ FIG. 4 discloses a block diagram showing a method used to find the constraints responding to the preferred minimized cost function, used in the first and second embodiments,:

$P_{NOISE}$ is calculated according to a block 110.

The delay parameter $\Delta$ is selected according to a block 111. This first selection of the delay parameter is dependent of an estimate of the location of a sample when the impulse response magnitude starts to rise.

$P_{ICI}$ is calculated according to a block 112.

$P_{ISI}$ is calculated according to a block 113.

The cost function J is calculated according to a block 114.

The constraint is introduced according to a block 115. According to the first embodiment, the constraint is selected among possible taps of the overall impulse response. According to the second embodiment, the constraint is selected among possible taps of the Time Domain Equalizer (TEQ).

The cost function is minimized according to a block 116. The last two steps, block 115 and 116, are repeated while selecting different constraints until the most preferable minimized cost function is found while the selected delay value $\Delta$ is used.

The value of the found preferred cost function is stored and compared to other stored values of preferred cost functions (if any so far), according to a block 117. A new delay value ($\Delta$+1) is then selected and the steps according to block 112 to 117 are repeated until the constraint and delay value corresponding to the best value of the cost function have been found.

In the third example embodiment the constraint is applied to the used tones, i.e. the accumulated power of the desired contributions received on the used tones is fixed to unity. The desired power of the data received over all used tones is equal to $P_{des}$. Minimization of the cost function subject to the constraint $P_{des}=1$ yields the following optimization problem:

$$q_{OPT} = \arg\min_{q, q^T H^T E_{des} H q=1} q^T(H^T(E_{ISI} + E_{ICI})H + E_{NOISE})q$$

To solve this problem, the eigenvector $d_{min}$ corresponding to the smallest eigenvalue of the matrix $$D=\sqrt{H^T E_{des} H}^{-1^T}(H^T(E_{ISI}+E_{ICI})H+E_{NOISE})\sqrt{H^T E_{des} H}^{-1}$$

must be calculated first. The desired Time Domain Equalizer TEQ is then obtained by the linear transformation $$q_{opt} = \sqrt{H^T E_{des} H}^{-1} \frac{d_{min}}{d_{min}^T d_{min}},$$

with $$H^T E_{des} H = \sqrt{H^T E_{des} H}^T \sqrt{H^T E_{des} H}.$$

The matrix $E_{des}$ is defined as $$E_{des} = \sum_{k \in k_u} E\{X_{des}^{k^T} R^H R X_{des}^k\}$$

where $X_{des}^k$, is the convolution matrix of the sequence $x_{des}^k[n]$. The sequence $x_{des}^k[n]$ is that sequence to be transmitted, which only contributes desired power to tone k at DMT symbol l in the receiver. $x_{des}^k[n]$ only transmits DMT symbol l , all; other DMT symbols are equal to zero. Within DMT symbol l only tone k is modulated.

In the fourth example embodiment the constraint is realized by fixing the energy of the Time Domain Equalizer TEQ.

$$q_{OPT} = \arg\min_{q, q^T q=1} q^T(H^T(E_{ISI} + E_{ICI})H + E_{NOISE})q$$

This optimization problem is solved by the eigenvector $d_{min}$ corresponding to the smallest eigenvalue $\lambda_{min}$ of the matrix $D=q^T(H^T(E_{ISI}+E_{ICI})H+E_{NOISE})q$ and scaling according to $$q_{opt} = \frac{d_{min}}{d_{min}^T d_{min}}$$

The method used to find the constraints in the third and fourth embodiments, responding to the preferred minimized cost function, is similar to the method described together with FIG. 4. The difference is that the chosen constraint is fixed during the whole method, while only the delay values are reselected during the repetition. This means that the loop between "minimizing the cost function" and "introducing the constraint" in FIG. 4 will be deleted.

Different variations are of course possible within the scope of the invention. For example can the sample frequency in the receiver be increased so that the time domain equalizer is over-sampled which will lead to a possibility to discard samples after the TEQ and thereby obtain better performance.

Instead of minimizing errors observed on the used tones, it is also possible to minimize the error observed on all tones. This approach has the advantage that the matrices representing the estimates $E_{ISI}$, $E_{ICI}$ and $E_{NOISE}$ will be less complex. In other words, the invention is not restricted to the above described and illustrated embodiments.

The invention claimed is:

1. Method to minimize error contributions in a Discrete Multitone Modulation transmission system comprising a transmitter and a receiver, the receiver comprising a time domain equalizer (TEQ) represented by a TEQ vector, where a received DMT-signal is affected by intersymbol interference, intercarrier interference and additive noise, comprising the following steps:
   calculating additive noise average power of the received DMT-signal;
   calculating intersymbol interference average power of the received DMT-signal;
   calculating intercarrier interference average power
   $$\left(P_{ICI} = \sum_{k \in k_u} q^T H^T E\{X_{ICI}^{kT} r_k^* r_k^T X_{ICI}^k\} H q\right)$$
   of the received DMT-signal;
   calculating a cost function by adding the intersymbol interference average power, the intercarrier interference average power, and the additive noise average power;
   introducing a constraint which avoids a trivial solution where the TEQ vector is equal to zero;
   minimizing the cost function by optimizing the TEQ vector.

2. Method to minimize error contributions according to claim 1, whereby the constraint is realized by fixing one tap of the overall impulse response.

3. Method to minimize error contributions according to claim 1, whereby the constraint is realized by fixing one tap of the Time Domain Equalizer (TEQ).

4. Method to minimize error contributions according to claim 1, whereby the constraint is realized by fixing the power of desired received signals on the used tones.

5. Method to minimize error contributions according to claim 1, whereby the constraint is realized by fixing the energy of the Time Domain Equalizer (TEQ).

6. Method to minimize error contributions according to claim 2, whereby a delay value corresponding to one tap of the channel impulse response is selected, and the constraint is selected by the following further steps:
   calculating the intersymbol interference average power;
   calculating the intercarrier interference average power;
   calculating the cost function;
   introducing a constraint by fixing one tap of the overall impulse response;
   minimizing the cost function by using the introduced constraint;
   repeating the above last two steps while selecting all available constraints;
   selecting a new delay value subsequent the already selected value;
   repeating the above seven steps until the best value for the cost function is found, whereby the constraint and the delay value corresponding to the best value of the cost function is selected.

7. Method to minimize error contributions according to claim 3, whereby a delay value corresponding to one tap of the channel impulse response is selected, and the constraint is selected by the following further steps:
   calculating the intersymbol interference average power;
   calculating the intercarrier interference average power;
   calculating the cost function;
   introducing the constraint by fixing one tap of the TEQ;
   minimizing the cost function by using the introduced constraint;
   repeating the above last two steps while selecting all available constraints;
   selecting a new delay value subsequent the already selected value;
   repeating above seven steps until the best value for the cost function is found, whereby the constraint and the delay value corresponding to the best value of the cost function is selected.

8. Method to minimize error contributions according to claim 4, whereby a delay value corresponding to one tap of the channel impulse response is selected by the following further steps:
   calculating the intersymbol interference average power;
   calculating the intercarrier interference average power;
   calculating the cost function;
   introducing the constraint by fixing the power of desired received signal on the used tones;
   minimizing the cost function by using the introduced constraint;
   selecting a new delay value subsequent the already selected value;
   repeating the above six steps until the best value for the cost function is found, whereby the delay value corresponding to the best value of the cost function is selected.

9. Method to minimize error contributions according to claim 5, whereby a delay value corresponding to one tap of the channel impulse response is selected by the following further steps:
   calculating the intersymbol interference average power;
   calculating the intercarrier interference average power;
   calculating the cost function;
   introducing the constraint by fixing the energy of the time domain equalizer (TEQ);
   minimizing the cost function by using the introduced constraint;
   selecting a new delay value subsequent the already selected value;
   repeating the above six steps until the best value for the cost function is found, whereby the delay value corresponding to the best value of the cost function is selected.

10. Method to minimize error contributions according to any of claim 1 which method comprises the following steps:
    increasing the sampling frequency in the receiver so that the time domain equalizer (TEQ) will be over-sampled;
    discarding selected samples of the TEQ output signal.

11. Arrangement to minimize error contributions in a Discrete Multitone Modulation transmission system comprising a transmitter, a receiver comprising a time domain equalizer (TEQ) represented by a TEQ vector, where a received DMT-signal is affected by intersymbol interference, intercarrier interference and additive noise, comprising:
    means for calculation of intersymbol interference average power of the received DMT-signal;

means for calculation of intercarrier interference average power $$\left(P_{ICI} = \sum_{k \in k_u} q^T H^T E\{X_{ICI}^{kT} r_k^* r_k^T X_{ICI}^k\} Hq\right)$$

of the received DMT-signal;
means for calculation of additive noise average power of the received DMT-signal;
means for calculation of a cost function by adding the intersymbol interference average power the intercarrier interference average power and the additive noise average power;
means for introducing a constraint which avoids a trivial solution where the TEQ vector is equal to zero;
means for minimizing the cost function by optimizing the TEQ vector.

12. Arrangement to minimize error contributions according to claim 11 comprising:
means to select a delay value corresponding to a tap of the channel impulse response;
means to introduce a constraint by fixing one tap of the overall impulse response;
means to find the best value for the cost function, whereby the constraint and the delay value corresponding to the best value of the cost function is found;
means to select the constraint and the delay value.

13. Arrangement to minimize error contributions according to claim 11 comprising:
means to select a delay value corresponding to a tap of the channel impulse response;
means to introduce a constraint by fixing one tap of the time domain equalizer (TEQ);
means to find the best value for the cost function, whereby the constraint and the delay value corresponding to the best value of the cost function is found;
means to select the constraint and the delay value.

14. Arrangement to minimize error contributions according to claim 11 comprising:
means to select a delay value corresponding to a tap of the channel impulse response;
means to introduce a constraint by fixing the power of the desired received signal on the used tones;
means to find the best value for the cost function, whereby the delay value corresponding to the best value of the cost function is found;
means to select the delay value.

15. Arrangement to minimize error contributions according to claim 11 comprising:
means to select a delay value corresponding to a tap of the channel impulse response;
means to introduce a constraint by fixing the energy of the time domain equalizer (TEQ);
means to find the best value for the cost function, whereby the delay value corresponding to the best value of the cost function is found;
means to select the delay value.

16. Arrangement to minimize error contributions according to claim 11 comprising:
means to increase the sampling frequency in the receiver so that the time domain equalizer (TEQ) will be oversampled;
means to discard selected samples of the TEQ output signal.

* * * * *

UNITED STATES PATENT AND TRADEMARK OFFICE
CERTIFICATE OF CORRECTION

| | |
|---|---|
| PATENT NO. | : 7,177,378 B2 |
| APPLICATION NO. | : 10/101505 |
| DATED | : February 13, 2007 |
| INVENTOR(S) | : Baldemair et al. |

It is certified that error appears in the above-identified patent and that said Letters Patent is hereby corrected as shown below:

In Column 2, Line 61, delete "twitted" and insert -- twisted --, therefor.

In Column 9, Line 20, in Claim 1, below "average power" delete

" $\left( P_{ICI} = \sum_{k \in k_u} q^T H^T E\{X_{ICI}^{kT} r_k^* r_k^T X_{ICI}^k\} Hq \right)$ ".

In Column 10, Line 54, in Claim 10, delete "any of" before "claim 1".

In Column 11, Line 5, in Claim 11, below "power" delete

" $\left( P_{ICI} = \sum_{k \in k_u} q^T H^T E\{X_{ICI}^{kT} r_k^* r_k^T X_{ICI}^k\} Hq \right)$ ".

Signed and Sealed this

Twentieth Day of May, 2008

JON W. DUDAS
*Director of the United States Patent and Trademark Office*